United States Patent [19]
Beale et al.

[11] Patent Number: 5,926,264
[45] Date of Patent: Jul. 20, 1999

[54] POSITION SENSING OF A REMOTE TARGET

[75] Inventors: Marc Ivor John Beale, Malvern; Robert Laurie Smith Devine, Glasgow, both of United Kingdom

[73] Assignee: The Secretary of State for Defence in Her Britannic Majesty's Government of the United Kingdom of Great Britain and Northern Ireland, Hants, United Kingdom

[21] Appl. No.: 08/809,925

[22] PCT Filed: Oct. 10, 1995

[86] PCT No.: PCT/GB95/02387

§ 371 Date: Apr. 10, 1997

§ 102(e) Date: Apr. 10, 1997

[87] PCT Pub. No.: WO96/12248

PCT Pub. Date: Apr. 25, 1996

[30] Foreign Application Priority Data

Oct. 12, 1994 [GB] United Kingdom .................. 9420578

[51] Int. Cl.⁶ ............................. G09G 5/08; G01B 11/26; G06K 11/08; G06F 3/00
[52] U.S. Cl. .................... 356/152.1; 356/139.03; 356/152.2; 356/152.3; 345/158
[58] Field of Search ............................. 356/139.03, 152.3, 356/152.1, 152.2; 345/158

[56] References Cited

U.S. PATENT DOCUMENTS

| | | |
|---|---|---|
| 4,150,285 | 4/1979 | Brienza et al. . |
| 4,209,255 | 6/1980 | Heynau . |
| 4,565,999 | 1/1986 | King et al. . |
| 4,713,535 | 12/1987 | Rhoades . |
| 4,721,386 | 1/1988 | Collyer .............................. 356/139.03 |
| 4,792,697 | 12/1988 | Parquier et al. ................... 356/139.03 |
| 4,823,170 | 4/1989 | Hansen . |
| 4,836,778 | 6/1989 | Baumrind et al. ................. 356/139.03 |
| 4,956,794 | 9/1990 | Zeevi et al. . |

FOREIGN PATENT DOCUMENTS

| | | |
|---|---|---|
| 0209411 A1 | 1/1987 | European Pat. Off. . |
| 2293714 | 7/1976 | France . |
| 2157426 | 10/1985 | United Kingdom . |

*Primary Examiner*—Stephen C. Buczinski
*Attorney, Agent, or Firm*—Nixon & Vanderhye P.C.

[57] ABSTRACT

Apparatus for the position sensing of a remote target. A preferred embodiment is used to control the position of a graphical pointer on a computer screen. A light emitting diode illuminates the head of the computer operator and an array of detectors detect radiation returned by a retroreflector attached to the head of the operator. Signal processing means is included to derive information about the position of the operator's head from the detector outputs and convert it to a form suitable for input to computer.

15 Claims, 4 Drawing Sheets

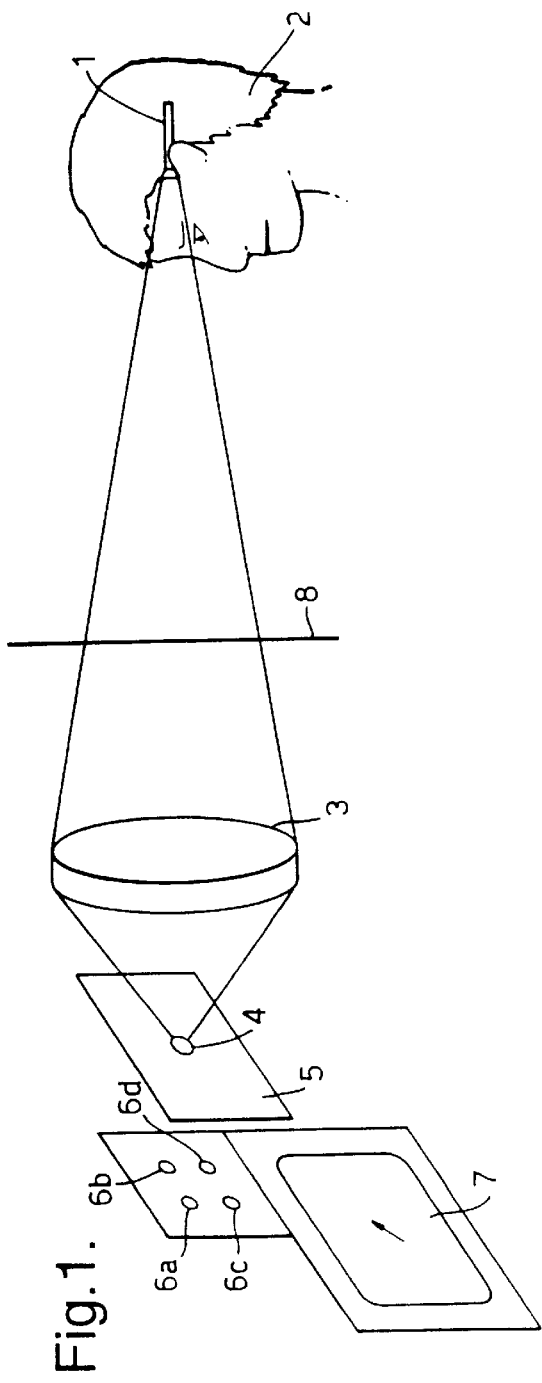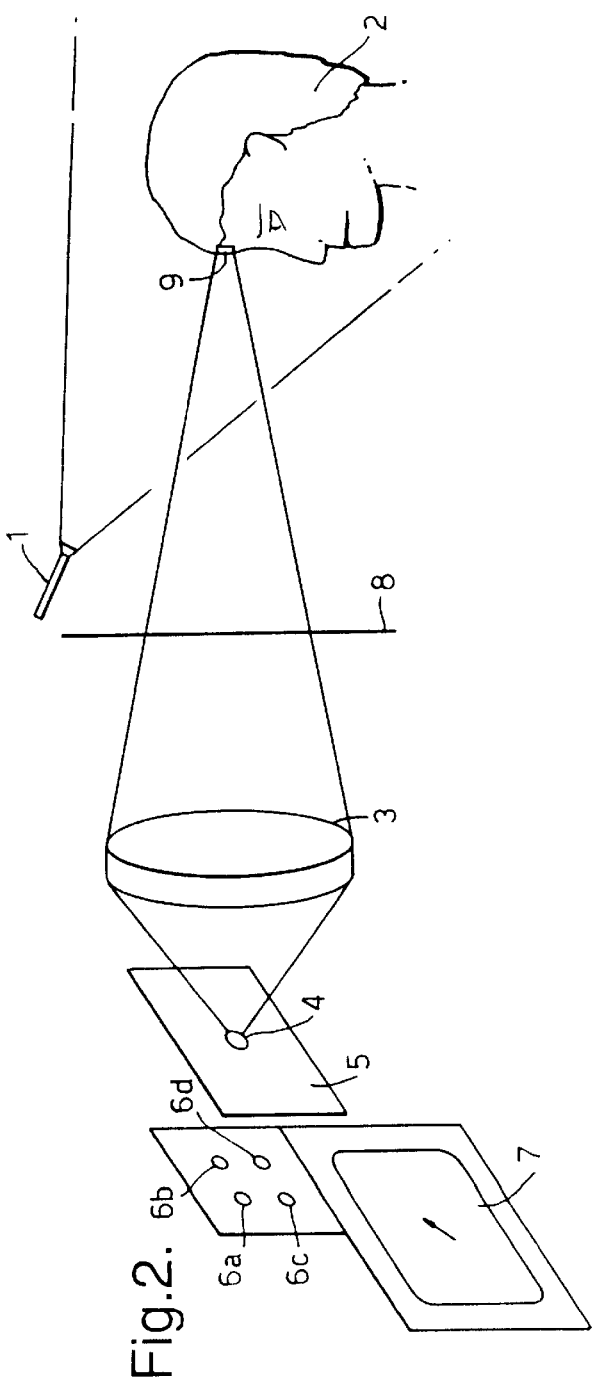

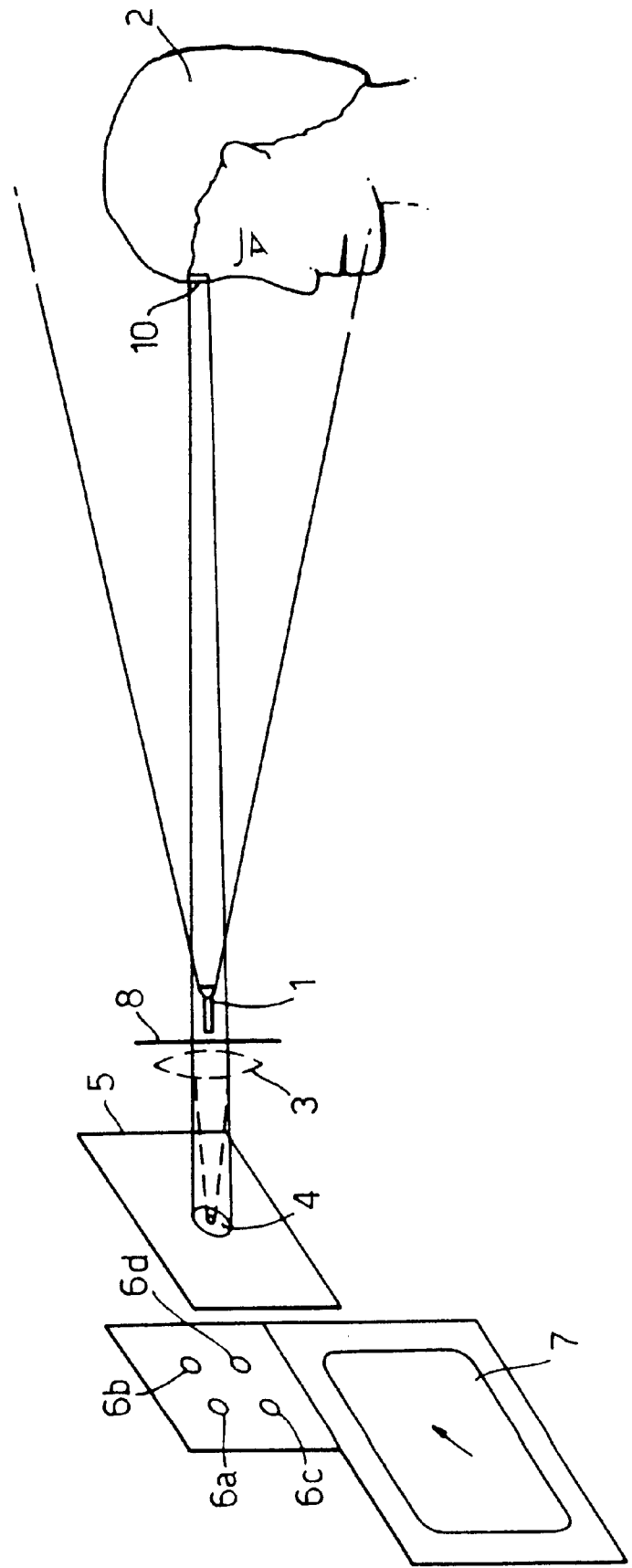

POSITION SENSING OF A REMOTE TARGET

BACKGROUND OF THE INVENTION

1. Field of the Invention

The current invention is concerned with position sensing of a remote target and has particular, but not exclusive, relevance to the computer industry.

2. Discussion of Prior Art

The computer industry is a rapidly evolving area of technology where manufacturers are constantly seeking innovations which will provide an advantage over competitors products. One particular area which is the object of much attention is the Human Computer Interface (HCI) or Man Machine Interface, that is, the means by which the computer operator communicates with the computer, inputting data and commands and receiving information.

The use of menu driven and windowing software greatly enhances the user friendliness of many computer related products, especially if such software is used in conjunction with a computer mouse or trackerball. These are handheld devices which allow the user to interact with software/hardware by moving a graphical pointer around on a computer screen, making selections from displayed options, manipulating software windows, drawing etc. by moving the mouse over a surface or operating the tracker ball by thumb motion and taking action by depressing a button.

A particular application of the current invention offers a system where the handheld mouse is redundant and the pointer on screen moves in response to movements of the operators head. This leaves both hands free to operate the keyboard which is particularly advantageous to, for example, typists.

The control of the cursor by movements of the operators head is very ergonomic and intuitive. The equivalent to depressing the mouse button may be achieved either by additional buttons on the keyboard or by detection of specific head movements such as a shake or nod. This may be achieved without the need for any wires, batteries or other impedimenta on the operator and may be implemented at a cost comparable to the existing mouse.

There are various ways in which the motion of the operators head can be used to control the cursor position on the screen.

Firstly, the motion of the head and the cursor may be locked together exactly, regardless of the speed of motion of the head. This is an absolute mode and is used in the implementation described in this specification.

Secondly, the motion of the head and cursor may be coupled in a manner dependent on both the position and speed of motion of the head. This is a relative mode and is the speed sensitive option available with some mouse systems. Slow movement of the head by one cm corresponds to movement of the cursor by one centimeter while rapid movement of the head by one cm results in say four cm of cursor movement. This option would be available with the system described and could be implemented in software or hardware.

Thirdly, the cursor may move only in response to motion of the head and not the absolute position of the head. The absolute head position can be extracted when a signal is present, but that signal is only present during motion.

Many other applications of the invention are envisaged: by exploiting the retroreflecting properties of the human eye, eye movements may be sensed to ensure that the driver of a vehicle is not falling asleep; the invention may be used to track objects other than the operators head; by movement of hand or foot or limb stump, disabled persons may control software driven apparatus carrying out any number of tasks; eye movement and head movement scanned in combination will allow gaze direction information to be extracted; in industry, process control in a dirty environment could be effected with the hands free; a pair systems of the invention could be used to obtain two directional fixes on a target, allowing the position in three dimensions to be established.

SUMMARY OF THE INVENTION

The invention makes use of electromagnetic radiation emanating from an object in deriving information about the position of that object. Such radiation may originate from a source fixed in relation to the object, may be reflected off the object, or the object itself could be the source of radiation. For the purpose of this specification. "emanating from the object should be taken to include any of these cases.

The radiation emanating from the object is used to illuminate an area of a plane. This may be achieved, for example, by gathering some of the radiation using a lens or by using a pinhole. By "pinhole" is meant an aperture through which a beam of radiation can pass, said beam having a defined boundary or boundaries and having sufficient intensity for the effective operation of the invention. Then, by the parallax effect, the two dimensional position of the illuminated area is dependent on the angular position of the target.

According to this invention, apparatus for the position sensing of a remote target comprises:

a source of radiation;

an array of detector elements, each of which is independently capable of producing an electrical output which is dependent on the intensity of radiation incident thereon and signal processing means for deriving information about the angular position of the target from the outputs of said detector elements, and is characterized by:

a retroreflector whose position is fixed in relation to the target and in that the source of radiation is located substantially on a line on which lies the array of detector elements and said retroreflector, said source being arranged to illuminate said retroreflector such that radiation is retroreflected towards the array and the intensity of radiation incident on each detector element varies, by the parallax effect, with the angular position of the target.

A preferred embodinent further includes a pinhole, located substantially on a line on which lies the array of detector elements and the source of radiation, and through which retroreflected radiation passes before illuminating said array.

The apparatus may be used to control the position of a graphical pointer on the computer screen. In such an embodiment the target might be part of the computer operator's body.

The detector elements could each comprise a photodiode.

Filtering means might be included for preventing radiation of a different wavelength to that emanating from the source from illuminating said array.

The radiation emanating from the source could be in the visible of infrared regions of the electromagnetic spectrum, or in some other region.

The apparatus might include means for modulating the output of the radiation source and corresponding means for demodulating the output of the detectors.

The general principles of the current invention may be applied to the position sensing of a remote target in general. In situations where the source of radiation is the target itself (for example infrared emission from the human body), passive systems are envisaged which could be applied, for example, in security systems.

BRIEF DESCRIPTION OF THE DRAWINGS

The invention will now be described with reference to the following figures in which:

FIG. 1 shows part of an embodiment of the invention in which the source of radiation is fixed to the operators head;

FIG. 2 shows part of an embodiment of the invention which utilises a fluorescent label, used in conjunction with a remote source of radiation, to provide radiation emanating from the direction of the operators head;

FIG. 3 shows part of an embodiment of the invention which uses a retroreflector used in conjunction with a source of radiation to provide radiation emanating from the direction of the operators head;

DETAILED DISCUSSION OF PREFERRED EMBODIMENTS

Figure 4:
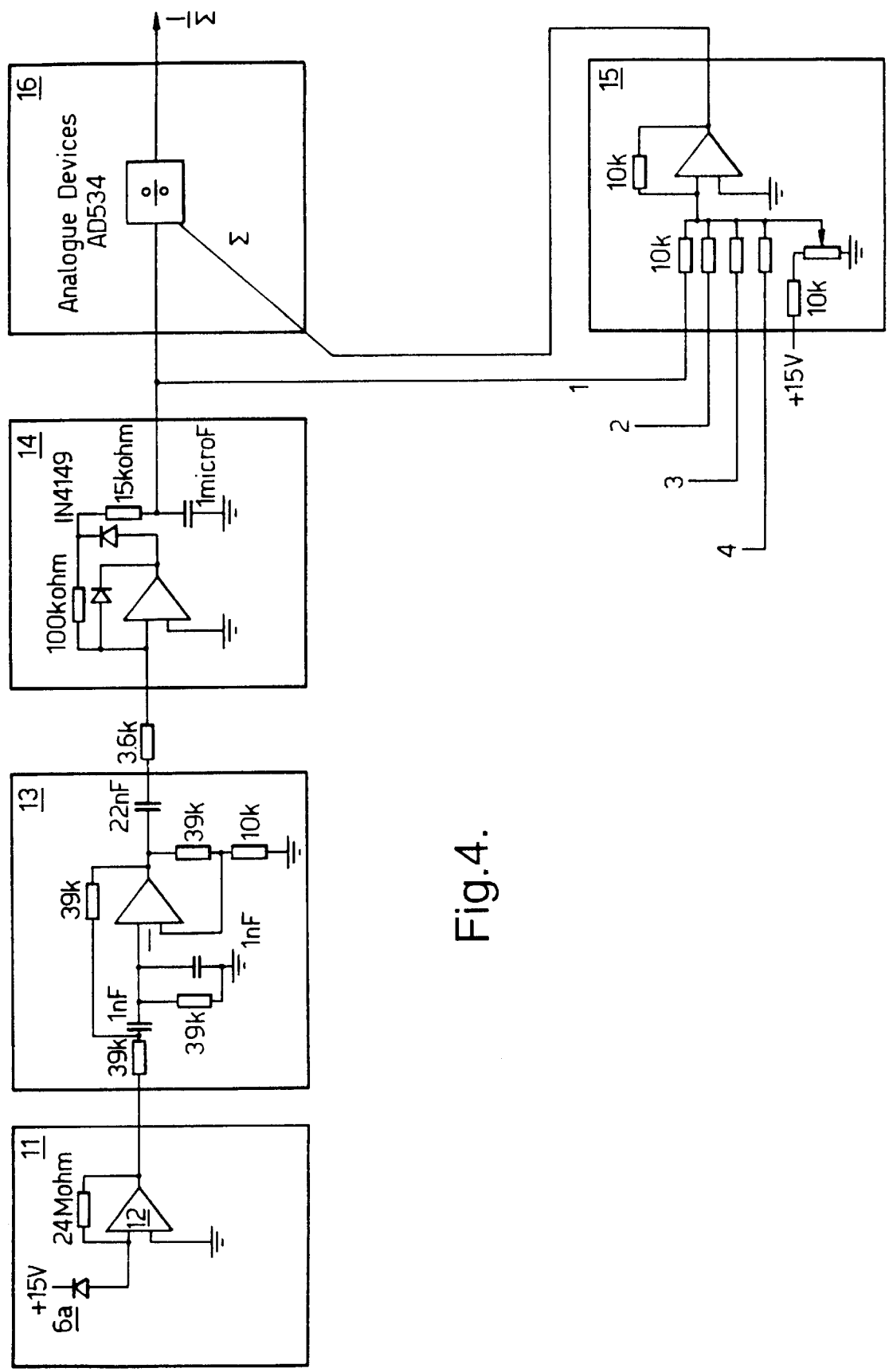
FIG. 4 shows electronic circuitry used to process the outputs of the detector elements.

Referring to FIG. 1, a simple embodiment of the invention comprises a source of electromagnetic radiation 1, for example a light emitting diode, attached to the head of the operator 2. Source 1 could, for example, take the form of a penlight tucked behind the ear. Radiation from source 1 is gathered by lens 3 and concentrated on an illuminated area 4 of a forward scattering diffuser screen 5 which could be a sheet of ground glass or greaseproof paper.

A backward scattering diffuser screen may prove equally effective (for example a sheet of white paper). In this case, the scattered light would be reflected and diodes 6a–6d would be situated on the opposite side of the screen 5 to that shown.

An array of electromagnetic radiation detector elements 6a, 6b, 6c and 6d, conveniently located in the vicinity of computer screen 7, detects radiation from illuminated area 4. The output of each detector 6a–6d depends on the position, in two dimensions, of illuminated area 4. The two dimensional position of illuminated area 4 depends, in turn, on the angular position of source 1, controlled by movements of the head of the operator 2.

In practice, a 2×2 array of detector elements was used, but arrays of other dimensions may also serve adequately. Throughout this specification the term array should be taken to include arrays of all dimensions including 1×1.

Inclusion of optical filter 8, whose passband is based on the wavelength of radiation produced by source 1, allows discrimination against radiation from other sources and hence improves the performance of the system.

Typically, detector elements 6a–6d would take the form of photodiodes. The use of other types of photodetector, for example phototransistors, is also feasible.

As an alternative to an array of detectors, a position sensitive detector such as device S1300 available from Hamamatsu Photonics UK Ltd may be used to derive an electrical signal which is dependent on the position of illuminated area 4.

Referring to FIG. 2, a fluorescent marker 9 is attached to the head of the operator 2. The marker 9 may, for example, be incorporated into a pair of spectacles or other article worn by the operator. Radiation source 1 is placed so that the head of the operator 2, and in particular marker 9, is within its field of illumination.

During operation marker 9 is illuminated by source 1, and produces, by fluorescence, an emission of radiation. Radiation from marker 9 is gathered by lens 3 and concentrated on an illuminated area 4 of diffuser screen 5. As before, detector elements 6a–6d detect radiation from area 4 and produce an output dependent on the position of the operators head 2.

By using a fluorescent marker 9 and an optical filter 8 whose passband is based on the radiation produced by fluorescence, it is possible to discriminate against inter alia radiation produced by source 1 and reflected off objects other than the marker on the operators head 2.

Referring to FIG. 3, illumination is supplied by a single Light Emitting Diode (LED) 1 situated substantially on the line between the head of the operator 2 and the array of detectors 6a–6d and arranged so that the head of the operator 2 lies within the field of illumination. The LED used in this particular embodiment was a Siemens SFH 487 GaAs infrared emitter nominally operating at 880 nm producing a 40 degree cone angle of illumination.

Modulation of the output from LED 1 is achieved by means of a 4 kHz square wave driving current, typically switching from 0 and 100 mA. Modulation is used to allow measurement of illumination originating from the LED 1 whilst discriminating against DC and mains derived frequency components of the background illumination.

A retroreflector 10 is attached to the head of the operator 2 in order to provide a strong return of radiation in the direction of LED 1. A perfect retroreflector would return narrow beam of parallel light which would be blocked by LED 1 itself. For the purpose of this invention an "imperfect" retroreflector returning a beam in a narrow cone angle of about 2 degrees is most suitable and for the purpose of this specification the term "retroreflector" should be taken to mean any device providing sufficient return of radiation for operation of the invention.

Some of the reflected radiation passes LED 1 and, after passing through optical filter 8 (optional), falls on diffuser screen 5 to produce an illuminated area 4. Diffuser screen 5 is located behind LED 1 so, by the parallax effect, the two dimensional position of illuminated area 4 is dependent upon the angular position of retroreflector 10 and hence the operators head 2. Therefore photodiodes 6a–6d each produce an output which is dependent on the angular position of the operators head 2. The system may be improved by inclusion of a lens 3 to gather returned radiation and focus it into a more concentrated image on screen 5.

Also, it is feasible that screen 5 may be omitted so that radiation returned from retroreflector 10 falls directly on to the array of detectors 6a–6d producing an area of illumination there.

Referring to FIG. 4, the circuitry represented therein is replicated for each of the four photodiodes 6a–6d shown in FIGS. 1–3.

The signal from each photodiode 6a–6d passes through a current to voltage converter stage 11. The preferred option for amplifier 12 used therein is a low noise operational amplifier with wide dynamic range. Where modulation of the illuminating radiation is used, a high pass filter 13 is used to discriminate against AC, DC and noise components of the signal which are due to background illumination. The cutoff of the filter used represents a balance between rejection of said AC, DC and noise components on the one hand and avoiding phase shifting of the modulated signal on the other. The latter gives rise to errors when summing the signals from each photodiode. With the 4 kHz modulation frequency associated with the apparatus of FIG. 3, a 2 kHz cutoff frequency was used.

The demodulated signal is then rectified and integrated at stage 14.

In order to reduce the dependence of the system on the distance of the operators head, automatic gain control of the signal is achieved by summing the four rectified, demodulated signals respectively associated with the four photodiodes 6a–6d and dividing each signal by the sum. The summation takes place at stage 15 which includes an offset voltage in order to limit the gain.

The individual and summed signals are each fed to stage 16 comprising an AD534 device supplied by Analogue Devices) where automatic gain control is effected.

Figure 5:
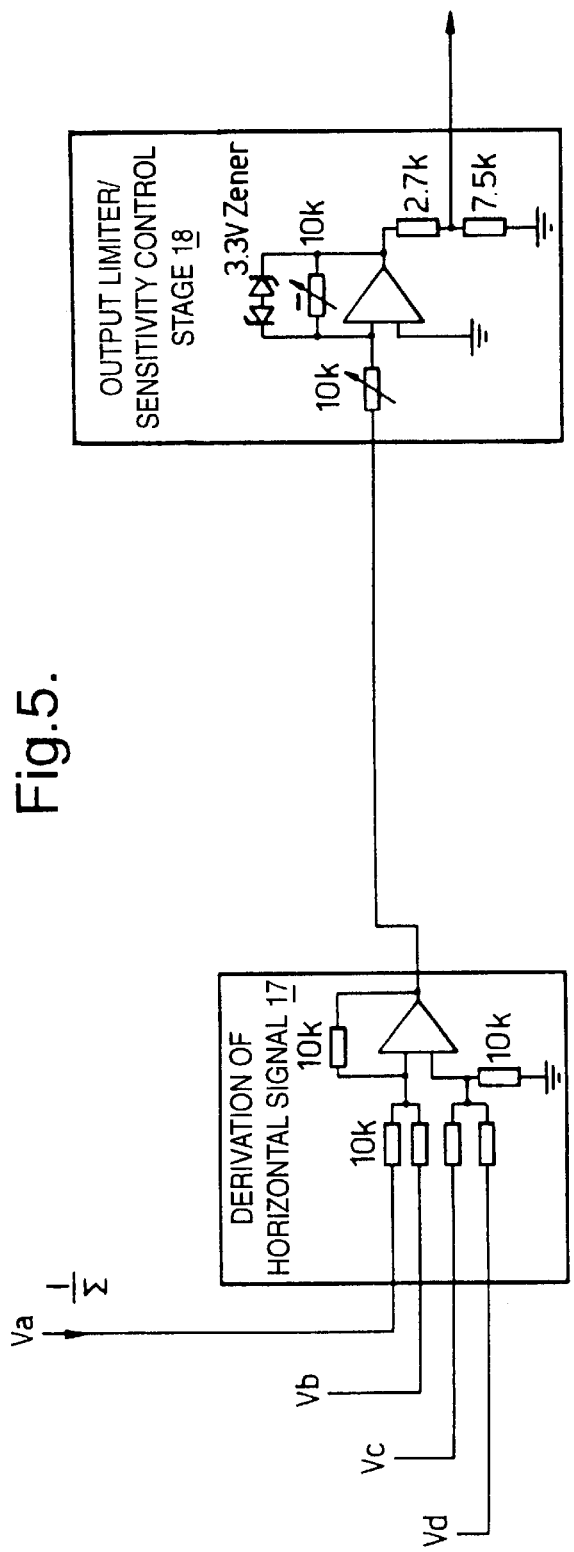
FIG. 5 shows further processing circuitry used to derive information, in one dimension, about the position of the target

Referring to FIG. 5, the horizontal signal is derived 17 by combining the four range compensated signals to obtain the quantity $(v_a+v_c)-(v_b+v_d)$, where $v_a$, $v_b$ etc. are the range compensated signals respectively derived from photodiodes 6a, 6b etc.

The magnitude of the systems response to lateral movements of the operators head may be adjusted at output limiter/sensitivity control stage 18.

A similar arrangement to that shown in FIG. 5 is used to derive the vertical signal by combining the four range compensated signals to obtain the quantity $(v_a+v_b)-(v_c+v_d)$.

Figure 6:
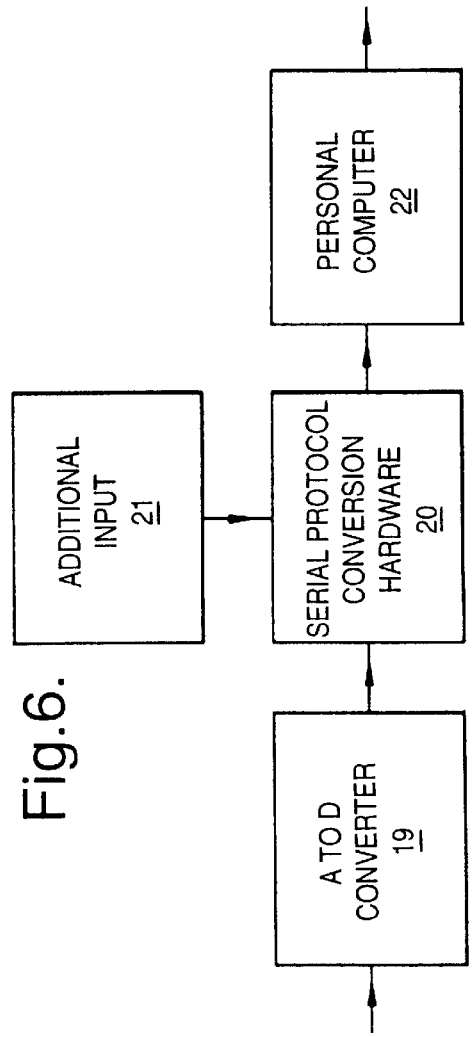
FIG. 6 is a representation of the interface between the current invention and a personal computer.

Referring to FIG. 6, the analogue outputs, from stage 18 FIG. 5, representing horizontal and vertical displacement are each converted to a 12-bit digital value by a two channel, 12 bit analogue to digital converter 19. The use of 12 bits permits a resolution of 4096 in each axis which is adequate for translation into personal computer screen coordinates of about 1024 pixels in each axis. The digitized horizontal and vertical displacement values are further processed by serial protocol conversion hardware 20 to provide an encoded RS232 sequence combining the displacement values and the status of a number of additional inputs 21 (in this case two) which take the place of the mouse buttons. In this embodiment, these inputs were derived from contact switches attached to the computer keyboard. An alternative embodiment takes action, as if a conventional mouse button has been pressed, in response to specific head movements (eg a nod or shake).

An implementation of the serial protocol conversion hardware 20 has been constructed using analogue to digital convertors and programmable logic arrays. However, other means for meeting the requirements specified above will be apparent to those skilled on the art.

The software package used was Windows (TM) version 3.1, produced by Microsoft (RTM) Corporation, run on a Compaq (TM) SLT personal computer. The Windows (TM) mouse device driver software was modified to accept the horizontal and vertical displacement information along with the information concerning the status of the additional inputs via the serial interface of the personal computer 22. This information is received on an interrupt basis. Each horizontal, and each vertical, datum received is relative to the last and the mouse driver software tracks this information passing an appropriate scaled and signed datum to the windows software. Thus the driver clips the coordinates of the remote position sensor to the actual screen coordinates.

The information from the additional inputs 21 corresponding to the left button of a conventional mouse was used as for a conventional mouse, that is to "click" on software options displayed on the computer screen. The other switch is used to reset the coordinates to the middle of the screen.

We claim:

1. Apparatus for controlling the position of a graphical pointer on a screen comprising:

a source of electromagnetic radiation, a radiation retroreflector, an array of at least two detector elements for detecting radiation emitted by the source and reflected by the retroreflector, each detector element producing an output which is dependent on the intensity of radiation incident thereon, and processing means for determining an angular position of the retroreflector from the outputs of the detector elements, a drive circuit, responsive to said processing means, for generating a graphical position control signal for said screen wherein the source of radiation is positioned on an axis which is substantially central and normal to the array such that radiation reflected by the retroreflector passes the source to be detected by the array and such that illumination of the array is dependent on the angular position of the retroreflector with respect to the axis, and wherein the retroreflector has a return beam cone angle such that sufficient reflected radiation passes the source to be detected by the array, further comprising a diffuser screen located optically between the source and the array.

2. Apparatus according to claim 1 wherein the apparatus further comprises a lens for focusing radiation reflected by the retroreflector.

3. Apparatus according to claim 1 wherein the return beam cone angle is approximately two degrees.

4. Apparatus for controlling the position of a graphical pointer on a screen comprising:

a source of electromagnetic radiation, a radiation retroreflector, a detector element for detecting radiation emitted by the source and reflected by the retroreflector, the detector element producing an output which is dependent on the position of radiation incident thereon, processing means for determining an angular position of the retroreflector from the output of the detector element, and a drive circuit, responsive to said processing means, for generating a graphical position control signal for said screen wherein the source of radiation is positioned on an axis which is substantially central and normal to the detector element such that radiation reflected by the retroreflector passes the source to be detected by the detector element and such that illumination of the detector element is dependent on the angular position of the retroreflector with respect to the axis, and wherein the retroreflector has a return beam cone angle such that sufficient reflected radiation passes the source to be detected by the detector element further comprising a diffuser screen located optically between the source and the detector element.

5. Apparatus according to claim 4 wherein the apparatus further comprises a lens for focusing radiation reflected by the retroreflector.

6. Apparatus according to claim 4 wherein the return beam cone angle is approximately two degrees.

7. An apparatus permitting an operator to control the position of a graphical pointer on a screen, said apparatus comprising:

a source of electromagnetic radiation along an axis;

an array of at least two detector elements centrally located on said axis, each element producing an output indicative of the intensity of said radiation incident thereon, a retroreflector of said radiation for reflecting at least a portion of said radiation on said array, said source located between said array and said retroreflector, said retroreflector having an angular position controlled by an operator, wherein changes in said retroreflector angular position by said operator changes position of said radiation on said array; and a processor, responsive to said detector element outputs, for providing a position controlling signal for said graphical pointer.

8. An apparatus according to claim 7, wherein said array comprises four elements, said four elements located in a plane normal to said axis.

9. An apparatus according to claim 7, wherein said retroreflector has a return beam cone angle of about 2 degrees.

10. An apparatus according to claim 7, further including a diffuser screen located between said source and said array.

11. An apparatus permitting an operator to control the position of a graphical pointer on a screen, said apparatus comprising:

a source of electromagnetic radiation along an axis;

a detector centrally located on said axis, said detector producing an output indicative of the position of said radiation incident thereon, a retroreflector of said radiation for reflecting at least a portion of said radiation on said detector, said source located between said detector and said retroreflector, said retroreflector having an angular position controlled by an operator, wherein changes in said retroreflector angular position by said operator changes position of said radiation on said detector; and a processor, responsive to said detector output, for providing a position controlling signal for said graphical pointer.

12. An apparatus according to claim 11, wherein said detector is located in a plane normal to said axis.

13. An apparatus according to claim 11, wherein said retroreflector has a return beam cone angle of about 2 degrees.

14. An apparatus according to claim 11, further including a diffuser screen located between said source and said detector.

15. A method of controlling the position of a graphical pointer on a screen, said method comprising the steps of:

providing electromagnetic radiation from a source and directed in a cone along an axis;

controlling the angular position of a retroreflector located within said cone, to at least partially reflect said radiation;

detecting the position of said reflected radiation relative to said axis at a distance from the retroreflector greater than the distance from the retroreflector to said source of radiation; and providing, in response to the detected position, a position controlling signal for said graphical pointer.

* * * * *